US011168002B2

(12) United States Patent
Daniels (10) Patent No.: US 11,168,002 B2
(45) Date of Patent: Nov. 9, 2021

(54) TOP-DOWN SYNTHESIS OF TWO-DIMENSIONAL NANOSHEETS

(71) Applicant: Nanoco 2D Materials Limited, Manchester (GB)

(72) Inventor: Steven Daniels, Manchester (GB)

(73) Assignee: Nanoco 2D Materials Limited, Manchester (GB)

( * ) Notice: Subject to any disclaimer, the term of this patent is extended or adjusted under 35 U.S.C. 154(b) by 0 days.

(21) Appl. No.: 16/202,856

(22) Filed: Nov. 28, 2018

(65) Prior Publication Data

US 2019/0169041 A1   Jun. 6, 2019

Related U.S. Application Data

(60) Provisional application No. 62/595,332, filed on Dec. 6, 2017.

(51) Int. Cl.
| | |
|---|---|
| *C01G 39/06* | (2006.01) |
| *C01G 41/00* | (2006.01) |
| *C01B 19/00* | (2006.01) |
| *C01G 1/12* | (2006.01) |
| *B82Y 40/00* | (2011.01) |
| *B01D 9/00* | (2006.01) |
| *C09K 11/67* | (2006.01) |
| *C09K 11/88* | (2006.01) |
| *B82Y 15/00* | (2011.01) |

(52) U.S. Cl.
CPC ............. *C01G 39/06* (2013.01); *B01D 9/005* (2013.01); *C01B 19/007* (2013.01); *C01G 1/12* (2013.01); *C01G 41/00* (2013.01); *C09K 11/671* (2013.01); *C09K 11/881* (2013.01); *B82Y 15/00* (2013.01); *B82Y 40/00* (2013.01); *C01P 2004/20* (2013.01); *C01P 2004/24* (2013.01); *C01P 2006/60* (2013.01); *C01P 2006/90* (2013.01)

(58) Field of Classification Search
CPC ........ C01G 39/06; C01G 41/00; B01D 9/005; B82Y 40/00; B82Y 15/00; C01P 2004/20; C01P 2006/60
See application file for complete search history.

(56) References Cited

U.S. PATENT DOCUMENTS

2018/0009676 A1* 1/2018 Pickett .................... B01J 13/00

FOREIGN PATENT DOCUMENTS

| CN | 103692763 A | 4/2014 |
|---|---|---|
| KR | 101754529 B1 * | 7/2017 |

OTHER PUBLICATIONS

Chakravarty, Disha, and Dattatray J. Late. "Exfoliation of bulk inorganic layered materials into nanosheets by the rapid quenching method and their electrochemical performance." European Journal of Inorganic Chemistry Nov. 2015 (2015): 1973-1980.*

(Continued)

*Primary Examiner* — Richard M Rump
(74) *Attorney, Agent, or Firm* — Blank Rome, LLP (57) ABSTRACT

A method for synthesizing two-dimensional (2D) nanosheets comprises heating a bulk material in a solvent. The process is scalable and can be used to produce solution-processable 2D nanosheets with uniform properties in large volumes.

13 Claims, 6 Drawing Sheets

(56) References Cited

OTHER PUBLICATIONS

Bhandavat, R., et al. "Large-Scale Synthesis of MoS2-Polymer Derived SiCN Composite Nanosheets." Advances in Synthesis, Processing, and Applications of Nanostructures: Ceramic Transactions 238 (2012): 45-52.*

Dang, Dinh Khoi, and Eui Jung Kim. "Solvothermal-assisted liquid-phase exfoliation of graphite in a mixed solvent of toluene and oleylamine." Nanoscale research letters 10.1 (2015): 6.*

Jawaid, Ali, et al. "Mechanism for liquid phase exfoliation of MoS2." Chemistry of Materials 28.1 (2016): 337-348.*

Dong, Huina, et al. "High-Yield Preparation and Electrochemical Properties of Few-Layer MoS 2 Nanosheets by Exfoliating Natural Molybdenite Powders Directly via a Coupled Ultrasonication-Milling Process." Nanoscale research letters 11.1 (2016): 1-14.*

Seo, Jung-wook, et al. "Two-dimensional nanosheet crystals." Angewandte Chemie International Edition 46.46 (2007): 8828-8831.*

Najafi, Leyla, et al. "Solution-processed hybrid graphene flake/2H-MoS2 quantum dot heterostructures for efficient electrochemical hydrogen evolution." Chemistry of Materials 29.14 (2017): 5782-5786.*

Štengl, Václav, Jakub Tolasz, and Daniela Popelková. "Ultrasonic preparation of tungsten disulfide single-layers and quantum dots." RSC advances 5.109 (2015): 89612-89620.*

Nguyen, Thang Phan, et al. "Size-dependent properties of two-dimensional MoS2 and WS2." The Journal of Physical Chemistry C 120.18 (2016): 10078-10085.*

Eda, Goki, et al. "Photoluminescence from chemically exfoliated MoS2." Nano letters 11.12 (2011): 5111-5116.*

Ahmad, Razi, et al. "Functionalized Molybdenum Disulfide Nanosheets for 0D-2D Hybrid Nanostructures: Photoinduced Charge Transfer and Enhanced Photoresponse." The Journal of Physical Chemistry Letters 8.8 (2017): 1729-1738.*

Oztas, Tugba, et al. "Synthesis of colloidal 2D/3D MoS2 nanostructures by pulsed laser ablation in an organic liquid environment." The Journal of Physical Chemistry C 118.51 (2014): 30120-30126.*

Sim, Dong Min, et al. "Long-term stable 2H—MoS2 dispersion: critical role of solvent for simultaneous phase restoration and surface functionalization of liquid-exfoliated MoS2." ACS omega 2.8 (2017): 4678-4687.*

Wang, Lai-Chun, et al. "Efficient exfoliation of bulk MoS2 to nanosheets by mixed-solvent refluxing method." International Journal of Hydrogen Energy 41.25 (2016): 10737-10743.*

Taran, Leila, and Reza Rasuli. "Cost-effective liquid-phase exfoliation of molybdenum disulfide by prefreezing and thermal-shock." Advanced Powder Technology 28.11 (2017): 2996-3003.*

Int'l Search Report & Written Opinion received in copending PCT Application No. PCT/GB2018/053505 dated Jan. 29, 2019, 21 pages.

Wang Lai-Chun, et al., "Efficient exfoliation of bulk MoS2to nanosheets by mixed-solvent refluxing method," International Journal of Hydrogen Energy, Elsevier Science Publishers B.V., Barking, GB, vol. 41, No. 25, Apr. 20, 2016 (Apr. 20, 2016) pp. 10737-10743, XP029600547.

Ali Jawaid, et al., "Mechanism for Liquid Phase Exfoliation of MoS 2," Chemistry of Materials, vol. 28, No. 1, Jan. 12, 2016 (Jan. 12, 2016), pp. 337-348, XP055543345.

Torben Daeneke, et al., "Reductive exfoliation of substoichiometric MoS 2 bilayers using hydrazine salts," Nanoscale, vol. 8, No. 33, Jan. 1, 2016 (Jan. 1, 2016), pp. 15252-15261, XP055318640.

Vaclav Stengl, et ali, "Strongly luminescent monolayered MoS2 prepared by effective ultrasound exfoliation," Nanoscale, vol. 5, No. 8, Jan. 1, 2013 (Jan. 1, 2013), p. 3387, XP055544631.

Jing-Yuan Wu, et al., "Photoluminescence of MoS2 Prepared by Effective Grinding-Assisted Sonication Exfoliation," Journal of Nanomaterials, vol. 2014, Jan. 1, 2014 (Jan. 1, 2014), pp. 1-7, XP055544871.

Hang,et al., "Morphology and photoluminescence of nanoscale few-layered MoS2 prepared by liquid phase exfoliation" Compound Semiconductor Week 2016 (MOP-ISCS-123).

* cited by examiner

TOP-DOWN SYNTHESIS OF TWO-DIMENSIONAL NANOSHEETS

CROSS-REFERENCE TO RELATED APPLICATIONS

This application claims the benefit of U.S. Provisional Application No. 62/595,332, filed Dec. 6, 2017, the entire contents of which are incorporated by reference herein.

STATEMENT REGARDING FEDERALLY SPONSORED RESEARCH OR DEVELOPMENT

Not Applicable

BACKGROUND OF THE INVENTION

1. Field of the Invention

The present invention generally relates to the synthesis of two-dimensional (2D) materials. More particularly, it relates to the top-down synthesis of 2D nanosheets from bulk material.

2. Description of the Related Art Including Information Disclosed Under 37 CFR 1.97 and 1.98

The isolation of graphene via the mechanical exfoliation of graphite [K. S. Novoselov, A. K. Geim, S. V. Morozov, D. Jiang, Y. Zhang, S. V. Dubnos, I. V. Grigorieva and A. A. Firsov, *Science*, 2004, 306, 666] has sparked strong interest in two-dimensional (2D) layered materials. The properties of graphene include exceptional strength, and high electrical and thermal conductivity, while being lightweight, flexible and transparent. This opens up the possibility of a wide array of potential applications, including high speed transistors and sensors, barrier materials, solar cells, batteries, and composites.

Other classes of 2D materials of interest include transition metal dichalcogenide (TMDC) materials, hexagonal boron nitride (h-BN), and those based on Group 14 elements, such as silicene and germanene. The properties of these materials can range from semi-metallic, e.g. $NiTe_2$ and $VSe_2$, to semiconducting, e.g. $WSe_2$ and $MoS_2$, to insulating, e.g. h-BN.

2D nanosheets of TMDC materials are of increasing interest for applications ranging from catalysis to sensing, energy storage and optoelectronic devices. Mono- and few-layered TMDCs are direct band gap semiconductors, with variation in band gap and carrier type (n- or p-type) depending on composition, structure and dimensionality.

Of the 2D TMDCs, the semiconductors $WSe_2$ and $MoS_2$ are of particular interest because, while largely preserving their bulk properties, additional properties arise due to quantum confinement effects when the dimensions of the materials are reduced to mono- or few layers. In the case of $WSe_2$ and $MoS_2$, these include the exhibition of an indirect-to-direct band gap transition, with strong excitonic effects, when the thickness is reduced to a single monolayer. This leads to a strong enhancement in photoluminescence efficiency, opening up new opportunities for the application of such materials in optoelectronic devices. Further, when the lateral dimensions of the materials are reduced on the nanoscale, they undergo a "size quantization" effect, whereby the newly instated band gap of the material changes and thus the optical, electronic and chemical properties of the material can be manipulated simply by changing the material's overall dimensions. Other materials of interest include $WS_2$ and $MoSe_2$.

Group 4 to 7 TMDCs predominantly crystallize in layered structures, leading to anisotropy in their electrical, chemical, mechanical and thermal properties. Each layer comprises a hexagonally packed layer of metal atoms sandwiched between two layers of chalcogen atoms via covalent bonds. Neighboring layers are weakly bound by van der Waals interactions, which may easily be broken by mechanical or chemical methods to create mono- and few-layer structures.

The lattice structure of 2D h-BN is similar to that of graphene. Due to its insulating properties, potential applications of h-BN include devices operating at high temperatures in oxidative environments and in insulating composites. Another use of h-BN is as an electrically insulating substrate that is perfectly lattice-matched to graphene.

The graphene analogues of silicon (silicene), germanium (germanene) and tin (stanene) have recently been investigated. One of the potential advantages of silicene is its compatibility with current silicon technology, enabling it to be applied to existing circuits and devices without additional processing steps. Germanene has potential applications in field-effect transistors, while theoretical studies suggest that stanene could find use in nanoelectronics.

For high-performance applications, flat, defect-free material is required, whereas for applications in batteries and supercapacitors, defects, voids and cavities are desirable.

Mono- and few-layer 2D materials can be produced using "top-down" and "bottom-up" approaches. Top-down approaches involve the removal of layers, either mechanically or chemically, from the bulk material. Such techniques include mechanical exfoliation, ultrasound-assisted liquid-phase exfoliation (LPE), and intercalation techniques. Bottom-up approaches, wherein layers are grown from their constituent elements, include chemical vapor deposition (CVD), atomic layer deposition (ALD), and molecular beam epitaxy (MBE), as well as solution-based approaches including hot-injection methods.

Monolayer and few-layer sheets of 2D materials can be produced in small quantities via the mechanical peeling of layers of the bulk solid (the so-called the "Scotch tape method") to produce uncharged sheets that interact through van der Waals forces only. Mechanical exfoliation may be used to yield highly crystalline layers on the order of millimeters, with size being limited by the single crystal grains of the starting material. However, the technique is low-yielding, not scalable and provides poor thickness control. Since the technique produces flakes of different sizes and thicknesses, optical identification must be used to locate the desired atomically thin flakes. As such, the technique is best suited to the production of 2D flakes for the demonstration of high-performance devices and condensed matter phenomena.

2D materials may be exfoliated in liquids by exploiting ultrasounds to extract single layers. The LPE process usually involves three steps: i) dispersion of bulk material in a solvent; ii) exfoliation; and, iii) purification. The purification step is necessary to separate the exfoliated flakes from the un-exfoliated flakes and usually requires ultracentrifugation. Ultrasound-assisted exfoliation is controlled by the formation, growth and implosive collapse of bubbles or voids in liquids due to pressure fluctuations. Sonication is used to disrupt the weak van der Waals forces between sheets to create few- and single-layer 2D flakes from bulk material. Despite the advantages offered by LPE in terms of scalability, challenges of the process include thickness control, poor reaction yields, and the production being limited to small flakes.

Silicene, germanene and stanene are not known to form bulk layered structures, therefore monolayers of these materials cannot be isolated using exfoliation techniques.

Large area scalability, uniformity and thickness control are routinely achieved for 2D materials using CVD. However, drawbacks include difficulty in maintaining uniform growth and wastefulness due to large amounts of unreacted precursors.

Solution-based approaches for the formation of 2D flakes are highly desirable, as they may offer control over the size, shape and uniformity of the resulting materials, as well as enabling ligands to be applied to the surface of the materials to provide solubility and, thus, solution processability. The application of organic ligands to the surface of the materials may also limit the degradation, as observed for CVD-grown samples, by acting as a barrier to oxygen and other foreign species. The resulting materials are free-standing, further facilitating their processability. However, the solution-based methods thus far developed do not provide a scalable reaction to generate 2D layered materials with the desired crystallographic phase, tunable narrow shape and size distributions and a volatile capping ligand, which is desirable so that it can be easily removed during device processing.

One of the challenges in the production of 2D layered materials is to achieve compositional uniformity, whether high quality defect-free or defect-containing material is required, on a large scale. Further challenges include forming 2D flakes with a homogeneous shape and size distribution.

Layered combinations of different 2D materials are generally called van der Waals heterostructures.

Van der Waals heterostructure devices have been investigated for a wide range of applications, from tunneling devices, to photovoltaic devices and light-emitting diodes. Different types of devices are formed by stacking different combinations of 2D materials with differing properties. Van der Waals heterostructure devices were originally formed by mechanically assembling stacks a slow and cumbersome process. [K. S. Novoselov, A. Mishchenko, A. Carvalho and A. H. Castro Neto, *Science*, 2016, 353, 461] An early method was based on preparing a 2D flake on a sacrificial membrane, aligning it and placing it on another flake, then removing the membrane. The process can be repeated to deposit further layers. Newer techniques have been developed, including the transfer of large-area crystals grown by CVD, the direct growth of heterostructures by CVD or physical epitaxy, and one-step growth in solution. Solution processing of 2D heterostructure devices is particularly attractive, as it offers a low cost, scalable deposition process.

In the prior art, solution-processed van der Waals heterostructure devices have relied on liquid-phase exfoliated 2D nanoflakes. For example, Withers et al. have described the solution processing of 2D heterostructure devices using 2D flakes formed by LPE of the corresponding bulk materials. [F. Withers, H. Yang, L. Britnell, A. P. Rooney, E. Lewis, C. R. Woods, V. Sanchez Romeguera, T. Georgiou, A. Eckmann, Y. J. Kim, S. G. Yeates, S. J. Haigh, A. K. Geim, K. S. Novoselov and C. Casiraghi, *Nano Lett.*, 2014, 14, 3987]. Heterostructures were created by depositing inks of graphene, TMDCs and hexagonal boron nitride (h-BN) via drop-casting, inkjet printing, and vacuum filtration. The study demonstrated that van der Waals heterostructure devices could be produced from solution-processed 2D materials. However, LPE of bulk powders can result in a broad size distribution of nanoflakes. Methods to selectively isolate nanosheets of similar size have been developed, but this process is highly wasteful of material. Moreover, reaction yields from LPE processes are typically poor.

Thus, there is a need for a synthesis method that produces uniform, solution-processable 2D materials in high yield.

BRIEF SUMMARY OF THE INVENTION

Herein, top-down methods for the synthesis of 2D nanosheets are described. Methods in accordance with the present disclosure comprise heating a bulk material in a solvent. The process is scalable and can be used to produce solution-processable 2D nanosheets with uniform properties in large volumes.

In some instances, the 2D nanosheets are 2D nanoparticles.

In some instances, the 2D nanosheets are 2D nanoflakes.

In some instances, the 2D nanosheets are 2D quantum dots.

In some instances, the solvent is a high boiling point solvent.

DETAILED DESCRIPTION OF THE INVENTION

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. Also, the use of "~" is throughout the disclosure is understood to be a symbolic representation the term "about." This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

Herein, top-down methods for the synthesis of 2D nanosheets are described. Methods in accordance with the present invention comprise heating a bulk material in a solvent. The process is scalable and can be used to produce 2D nanosheets with uniform properties in large volumes.

As used herein, the term "2D nanosheet" is used to describe a particle having a thickness between 1 to 10 atomic or molecular monolayers, and wherein the lateral dimensions are greater than the thickness. The term "nanoparticle" is used to describe a particle with dimensions on the order of approximately 1 to 100 nm. The term "quantum dot" (QD) is used to describe a semiconductor nanoparticle displaying quantum confinement effects. The dimensions of QDs are typically, but not exclusively, between 1 to 10 nm. The terms "nanoparticle" and "quantum dot" are not intended to imply any restrictions on the shape of the particle. The term "2D nanoparticle" is used to describe a particle with lateral dimensions on the order of approximately 1 to 100 nm and a thickness between 1 to 10 atomic or molecular layers, and wherein the lateral dimensions are greater than the thickness. The term "2D nanoflake" is used to describe a particle with lateral dimensions on the order of approximately 1 to 100 nm and a thickness between 1 to 5 atomic or molecular monolayers. The term "2D quantum dot" or "2D QD" is used to describe a semiconductor nanoparticle with a thickness of about 1 to 5 atomic or molecular monolayers and lateral dimensions that result in the nanoparticle being in the quantum confinement regime, i.e. the electronic properties of the nanoparticle differ to those of the bulk material.

As used herein, the term "bulk material" means a three-dimensional material wherein all three dimensions are 500 nm of greater.

As used herein, the term "high boiling point solvent" means a solvent having a boiling point of 100° C. of greater. For example, a high boiling point solvent may have a boiling point in the range of 100-450° C., for example, 250-400° C., or more particularly 300-350° C.

The composition of the bulk material is unrestricted. Suitable materials include, but are not restricted to:
graphite;
transition metal dichalcogenides (TMDCs) such as, for example, $WO_2$; $WS_2$; $WSe_2$; $WTe_2$; $MnO_2$; $MoO_2$; $MoS_2$; $MoSe_2$; $MoTe_2$; $NiO_2$; $NiTe_2$; $NiSe_2$; $VO_2$; $VS_2$; $VSe_2$; $TaS_2$; $TaSe_2$; $RuO_2$; $RhTe_2$; $PdTe_2$; $HfS_2$; $NbS_2$; $NbSe_2$; $NbTe_2$; $FeS_2$; $TiO_2$; $TiS_2$; $TiSe_2$; and $ZrS_2$;
transition metal trichalcogenides such as, for example, $TaO_3$; $MnO_3$; $WO_3$; $ZrS_3$; $ZrSe_3$; $HfS_3$; and $HfSe_3$;
Group 13-16 (III-VI) compounds such as, for example, InS; InSe; GaS; GaSe; and GaTe;
Group 15-16 (IV-VI) compounds such as, for example, $Bi_2Se_3$; and $Bi_2Te_3$;
nitrides such as, for example, BN;
oxides such as, for example, $LaVO_3$; $LaMnO_3$; $V_2O_5$; $LaNbO_7$; $Ca_2Nb_3O_{10}$; $Ni(OH)_2$; and $Eu(OH)_2$; layered copper oxides; micas; and bismuth strontium calcium copper oxide (BSCCO); and
phosphides such as, for example, $Li_7MnP_4$; and $MnP_4$.

Within the aforementioned materials, adjacent layers are held together by van der Waals interactions, which can readily be broken to form 2D nanoparticles. In alternative embodiments, the bulk material comprises non-layered semiconductor materials, including, but not restricted to:
Group 12-16 (II-VI) semiconductors such as, for example, ZnS; ZnSe; CdS; CdSe; CdTe;
Group 13-15 (III-V) materials such as, for example, GaN; GaP; GaAs; InN; InP; InAs; and
Group materials such as, for example, $CuGaS_2$; $CuGaSe_2$; $CuGa(S,Se)_2$; $CuInS_2$, $CuInSe_2$; $CuIn(S,Se)_2$; $Cu(In,Ga)S_2$; $Cu(In,Ga)Se_2$; $Cu(In,Ga)(S,Se)_2$; $CuInTe_2$; $AgInS_2$; and $AgInSe_2$;
Group 14 elements, for example, Si; Ge; and Sn;
and including doped species and alloys thereof.

In yet further embodiments, the bulk material may comprise a metal, such as, but not restricted to: Ag; Au; Cu; Pt; Pd; Ru; and Re, and including doped species and alloys thereof.

In some instances, methods in accordance with the present disclosure comprise heating the bulk material in a solvent to form 2D nanosheets. One of ordinary skill in the art will recognize that the maximum temperature at which the bulk material is heated will depend on the boiling point of the solvent in which the solution is formed. In some instances, the solvent is heated to its boiling point and the bulk material is refluxed in the solvent. Without wishing to be bound by any particular theory, one possible mechanism is that the application of heat may thermally expand the layers within the bulk material; refluxing the material in a solvent may form a gas that locates between adjacent layers and then exfoliates or forces the layers apart. In some embodiments, the solution comprises a coordinating solvent. Examples of suitable coordinating solvents include, but are not restricted to: saturated alkyl amines such as, for example, $C_6$-$C_{50}$ alkyl amines; unsaturated alkyl amines such as, for example, oleylamine; fatty acids such as, for example, myristic acid, palmitic acid, and oleic acid; phosphines such as, for example, trioctylphosphine (TOP); phosphine oxides such as, for example, trioctylphosphine oxide (TOPO); alcohols such as, for example isopropanol, hexadecanol, benzylalcohol, ethylene glycol, propylene glycol;

and may include primary, secondary, tertiary and branched solvents. In one embodiment, the solution comprises a coordinating solvent having more than two or more functional groups. The two or more functional groups may be the same or different. Suitable solvents include, but are not restricted to, diamines, for example, ethylenediamine. In some embodiments, the solution comprises a non-coordinating solvent, such as, but not restricted to, a $C_{11}$-$C_{50}$ alkane.

In some embodiments, the boiling point of the solvent is between 60° C. to 600° C., for example, 160° C. to 400° C., or more particularly 180° C. to 360° C. In at least one embodiment, the solvent is a high boiling point solvent. In a particular embodiment, the solvent is myristic acid. The yield of 2D nanosheets formed may be influenced by the time in which the bulk material is heated in the solvent. Increasing the duration of time at which the bulk material is heated in the solvent may increase the yield of 2D nanosheets formed. The yield of the nanosheets formed may further be influenced by the temperature at which the bulk material is heated in the solvent. Increasing the temperature at which the bulk material is heated in the solvent may increase the yield of 2D nanosheets formed. In some instances, the bulk material can be heated in the solvent to a temperature of between about 200° C. and about 330° C. for about 15 minutes or longer, and more particularly for 1 hour or longer. In at least one embodiment, the bulk material is heated in the solvent and refluxed for 6 hours or longer. In some instances, heating of the material can be performed for a period of up to about 12 hours. Generally, as the heating time is increased, the yield of the 2D nanosheets increases. The inventors have also discovered, however, that as the heating time is increased the emission spectrum of the resulting 2D nanosheets broadens. Therefore, while increasing the heating time may result in a higher yield of product, such high yield product may have emission spectra which is undesirable broad and therefore unfavorable for use in applications requiring narrow emission profiles. In some instances, optimal reaction time depend upon the properties of the bulk material, such as composition, interlayer spacing (i.e., bulk material density), surface area, etc. In at least one embodiment, the bulk material is refluxed in a high boiling point fatty acid solvent.

The choice of functional group(s) on the solvent may be used to control the dimensions and the size distribution of the nanosheets formed.

The 2D nanosheets may be isolated using any method. Suitable methods include, but are not restricted to, centrifugation, filtration, dialysis, or column chromatography. In at least one embodiment, a size-selective isolation procedure may be used extract 2D nanosheets of similar dimensions and thus having similar emissive properties.

When the 2D nanosheets are produced in a coordinating solvent, the coordinating solvent may act as a capping ligand that binds to a surface of the 2D nanosheets and alter their solubility. Thus, the 2D nanosheets may be dissolved or dispersed in a suitable solvent to provide solution processability. Solution-processable 2D nanosheets are particularly attractive for applications such as photoluminescent displays and lighting, electroluminescent displays and lighting, 2D heterostructure devices, sensors, and biological imaging.

In some embodiments, the nanosheets are 2D nanoparticles. In some embodiments, the 2D nanosheets are 2D nanoflakes. 2D nanoflakes are of particular interest because of the unusual properties of many materials as their dimensions are reduced to a few monolayers or less.

In some embodiments, the 2D nanoflakes are 2D QDs. Conventional QDs have widely been investigated for their unique optical, electronic and chemical properties, which originate from "quantum confinement effects"; as the dimensions of a semiconductor nanoparticle are reduced below twice the Bohr exciton radius, the energy levels become quantized, giving rise to discrete energy levels. The band gap increases with decreasing particle size, leading to size-tunable optical, electronic and chemical properties, such as size-dependent photoluminescence. Moreover, it has been found that reducing the lateral dimensions of a 2D nanoflake of a semiconductor material into the quantum confinement regime may give rise to yet further unique properties, depending on both the lateral dimensions and the number of layers of the 2D nanoflake. In some embodiments, the lateral dimensions of the 2D nanoflakes may be in the quantum confinement regime, wherein the optical, electronic and chemical properties of the nanoparticles may be manipulated by changing their lateral dimensions. For example, metal chalcogenide monolayer nanoflakes of materials such as $MoSe_2$ and $WSe_2$ with lateral dimensions of approximately 10 nm or less may display properties such as size-tunable emission when excited. This can enable the electroluminescence maximum ($EL_{max}$) or photoluminescence ($PL_{max}$) of the 2D nanoflakes to be tuned by manipulating the lateral dimensions of the nanoparticles.

As used herein, a "2D quantum dot" or "2D QD" refers to a semiconductor nanoparticle with lateral dimensions in the quantum confinement regime and a thickness between 1-5 atomic or molecular monolayers and lateral dimensions that result in the nanoparticle being in the quantum confinement regime, i.e. the electronic properties of the nanoparticle differ to those of the bulk material. As used herein, a "single-layered quantum dot" or "single-layered QD" refers to a semiconductor nanoparticle with lateral dimensions in the quantum confinement regime and a thickness of a single monolayer. Compared with conventional QDs, 2D QDs have a much higher surface area-to-volume ratio, which increases as the number of monolayers is decreased. The highest surface area-to-volume ratio is seen for single-layered QDs. This may lead to 2D QDs having very different surface chemistry from conventional QDs, which may be exploited for applications such as catalysis.

EXAMPLES

In many of the examples below, certain steps are performed under reflux conditions. As used herein, reflux is understood to be a distillation technique involving the condensation of vapors and the return of this condensate to the system from which it originated. Specifically, a mixture of reactants and solvent is placed in a suitable reaction vessel. This vessel is connected to a water-cooled Liebig or Vigreux condenser, which is may be sealed or open to the atmosphere at the top. The reaction vessel is heated in order to boil the reaction mixture; vapours produced from the mixture are condensed by the condenser, and return to the vessel through gravity. The purpose is to thermally accelerate the reaction by conducting it at an elevated, controlled temperature (i.e. the solvent's boiling point) and ambient pressure.

Example 1: Preparation of $MoS_2$ 2D Nanosheets

Bulk $MoS_2$ powder (0.120 g) and myristic acid (10 g) were combined in a round-bottom flask. The mixture was heated under vacuum at 110° C. for 1 hour, then placed under $N_2$. The reaction mixture was heated to reflux temperature (~330° C.) and held for a given time period (see Table 1), before cooling to 60° C. Toluene (30 mL) was added, followed by centrifugation at 8,000 rpm for 5 minutes. A dark yellow supernatant was separated from black unexfoliated bulk $MoS_2$. The black unexfoliated bulk $MoS_2$ was re-washed with toluene (20 mL) and centrifuged at 8,000 rpm for 5 minutes. The supernatant was combined with that from the first centrifugation, then dried under vacuum.

Acetonitrile (150 mL) was added to the dried residue from the supernatant, then the sample was warmed to 60° C. Free excess myristic acid dissolved, leaving an oily solid. The supernatant was decanted and discarded. The process was repeated three times.

To the oil, once dried, a 0.25 M solution of potassium carbonate (50 mL) was added, and the mixture was warmed to 50° C. with shaking. The supernatant was decanted and discarded, while a dark coloured material containing the $MoS_2$ 2D nanosheets was retained, then washed twice with deionised water.

Acetonitrile (100 mL) was added to the dark coloured material, followed by warming, then the supernatant was decanted and discarded. The process was repeated twice further and the product retained as a solid.

Figure 1:
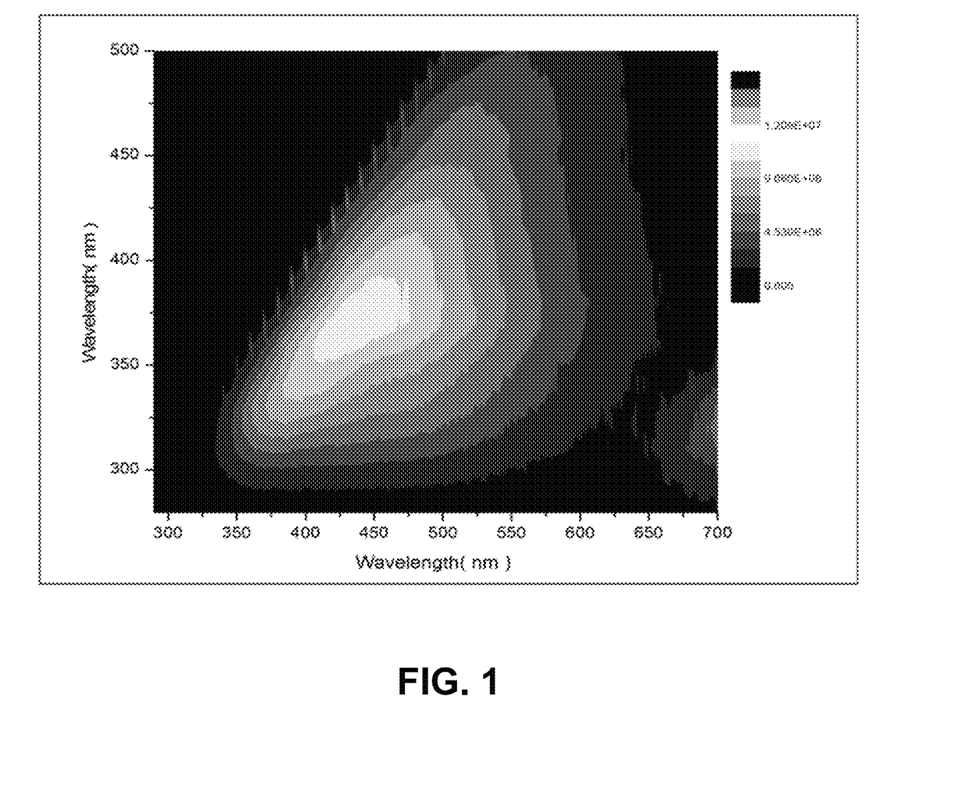
FIG. 1 shows a photoluminescence contour map of $MoS_2$ 2D nanosheets prepared according to Example 1.

When the time period for reflux was varied between 50 minutes and 6 hours, the photoluminescence (PL) contour map of the material very similar, but the longer reflux time led to a greatly enhanced reaction yield. A typical PL contour map is shown in FIG. 1. The PL contour map shows the emission wavelength (x-axis) plotted against excitation wavelength (y-axis) for a solution of the $MoS_2$ 2D nanosheets dissolved in toluene. Broad, bright PL was observed, spanning the ultraviolet to red regions of the electromagnetic spectrum, with a $PL_{max}$ at approximately 450 nm.

Example 2: Preparation of Other 2D Nanosheets

The process in Example 1 was repeated but with the bulk powder and/or solvent and/or reaction temperature and/or reaction time changed, as summarized in Table 1.

TABLE 1

| BULK MATERIAL | SOLVENT | RXN TEMP. | RXN TIME | OBSERVATIONS |
|---|---|---|---|---|
| $MoS_2$ | Hexadecylamine | Reflux (~330° C.) | 20 min | Poor yield PL spanning UV to green ($PL_{max}$ ~420 nm) |
| $MoS_2$ | Hexadecylamine | Reflux (~330° C.) | 6 h | Good yield PL spanning UV to green ($PL_{max}$ ~420 nm) |
| $MoS_2$ | Trioctylphosphine oxide | 330° C. | 6 h | Poor yield Short PL material spanning UV to blue ($PL_{max}$ ~360 nm) |
| $MoS_2$ | Trioctylphosphine oxide | Reflux (~400° C.) | 6 h | Poor yield Short PL material spanning UV to blue ($PL_{max}$ ~360 nm) |
| $MoS_2$ | Hexadecanol | Reflux (~325° C.) | 6 h | High yield PL spanning UV to green ($PL_{max}$ ~375 nm) |
| $MoS_2$ | Octadecane | Reflux (~317° C.) | 6 h | Short PL spanning UV to blue ($PL_{max}$ ~370 nm) |
| $MoS_2$ | Acetic acid | Reflux (~117-118° C.) | 6 h | Poor yield Short PL material spanning blue to green ($PL_{max}$ ~440 nm) |
| $MoS_2$ | Octane + myristic acid | Reflux (~125° C.) | 6 h | Poor yield Short PL |
| $MoS_2$ | Ethylene diamine | Reflux (~116° C.) | 6 h | PL spanning UV to yellow ($PL_{max}$ ~420 & 480 nm) |
| $MoSe_2$ | Myristic acid | Reflux (~330° C.) | 6 h | Broad PL spanning UV to red ($PL_{max}$ ~380 nm) |
| $WS_2$ | Myristic acid | Reflux (~330° C.) | 6 h | PL spanning blue to red ($PL_{max}$ ~500 nm) |

Figure 2:
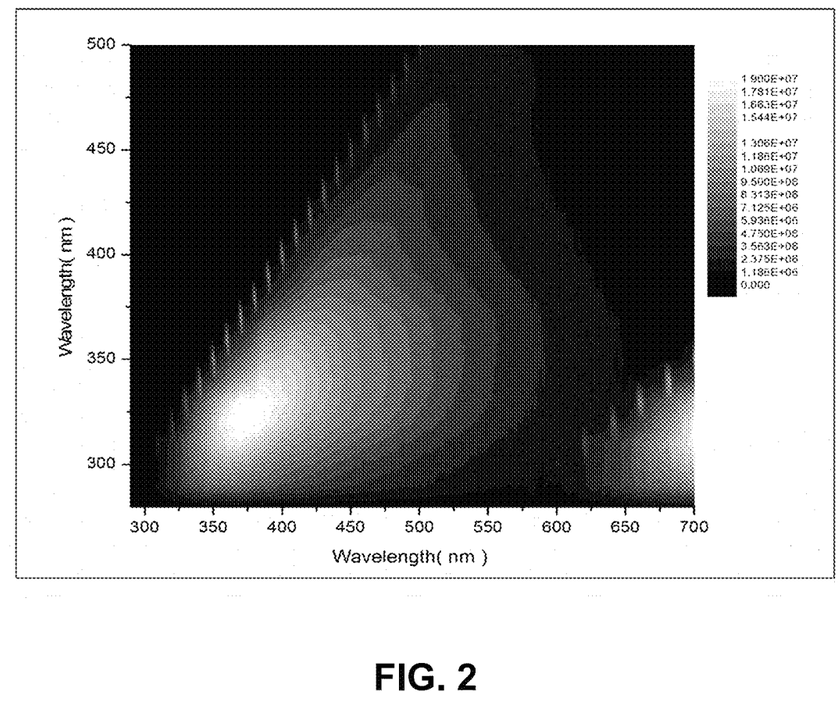
FIG. 2 shows a photoluminescence contour map of $MoS_2$ 2D nanosheets prepared in hexadecanol.
Figure 3:
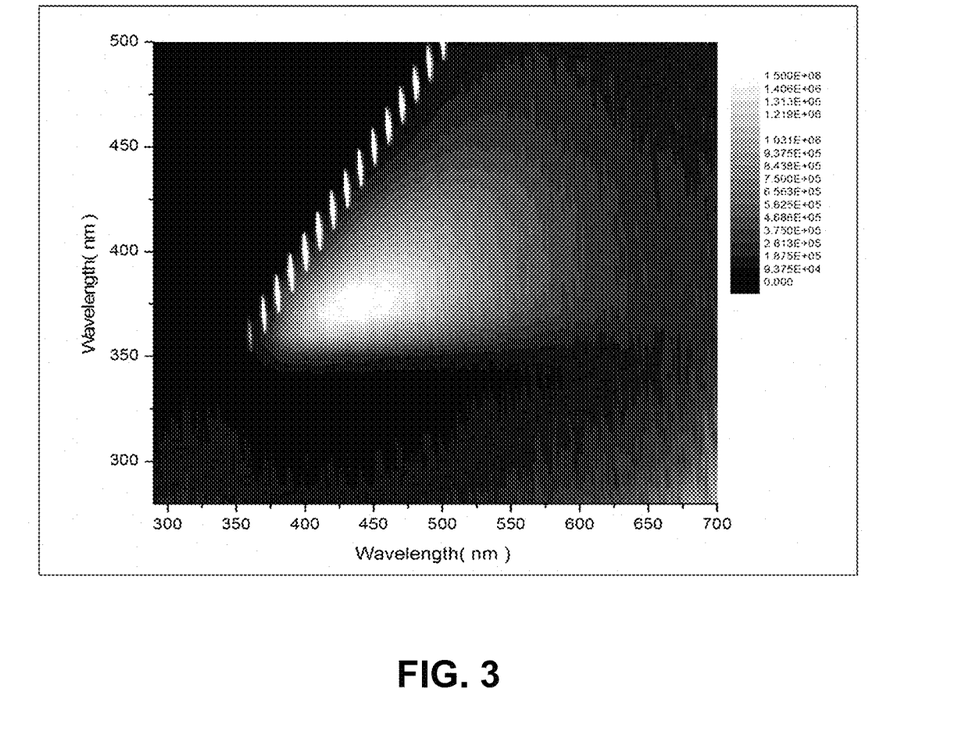
FIG. 3 shows a photoluminescence contour map of $MoS_2$ 2D nanosheets prepared in acetic acid.

The PL contour maps of the $MoS_2$ nanosheets produced in hexadecanol and in acetic acid are shown in FIGS. 2 and 3, respectively. FIG. 2 shows that, when $MoS_2$ was heated to reflux (~325° C.) in hexadecanol, the emission spanned from ~325 nm (UV) to ~525 nm (green), with a $PL_{max}$ at ~375 nm. FIG. 3 shows that, when $MoS_2$ was heated to reflux (~117-118° C.) in acetic acid, the emission spanned from ~375 nm (UV) to ~525 nm (green), with a $PL_{max}$ at ~440 nm.

Example 3: Preparation of $MoS_2$ 2D Nanosheets

Bulk $MoS_2$ powder (0.2 g) was mixed with myristic acid (10 g) and tetramethylammonium hydroxide pentahydrate (4 g). The mixture was placed under a high vacuum and warmed to 100° C. for 1 hour. The reaction was then heated to reflux for 15 hours. A large amount of material had boiled off, so hexadecane (10 mL) was added and held at 250° C. for 2 hours, before cooling to room temperature. A PL contour map of the resulting material is shown in FIG. 4, which shows PL spanning the UV (~400 nm) to red (~610 nm) with a $PL_{max}$ 480 nm.

To clean and extract the material emitting with a $PL_{max}$ greater than 480 nm, corresponding to larger $MoS_2$ 2D nanosheets, isopropanol (500 mL) was added, then stirred for 5 minutes, followed by centrifugation. The supernatant contained blue-emitting material and was set aside. This material was found in the precipitate and was dissolved in toluene, before filtering through a 0.2 µm PTFE syringe filter. The sample was dried and the material was rinsed with further portions of isopropanol, with 5 minute stirring intervals before decanting the isopropanol, adding more isopropanol and repeating until little to no PL was detected in the isopropanol rinses. To the residual solid, acetone was added and a bright (25-30% QY at 360 nm excitation) material was extracted with emission spanning the blue (~425 nm) to red (~625 nm) and a $PL_{max}$ of 518 nm (see FIG. 5). The remaining material (once the material emitting at 518 nm had been removed) displayed longer emission but was less bright (see FIG. 6). The material in FIG. 6 showed emission spanning the blue (~475 nm) to the NIR (700 nm), with a $PL_{max}$~575 nm.

Figure 4:
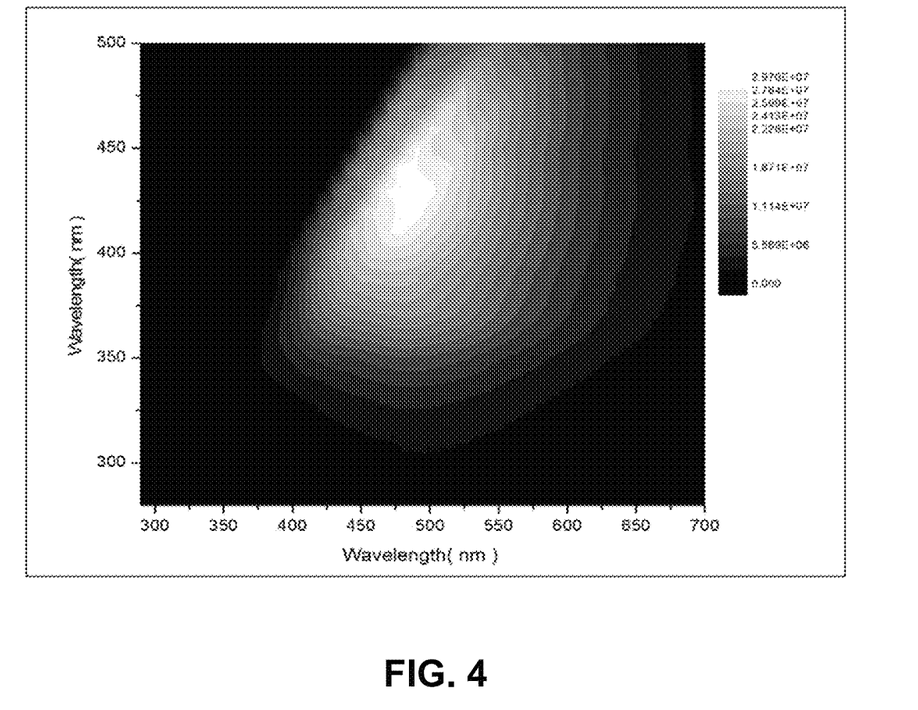
FIG. 4 shows a photoluminescence contour map of $MoS_2$ 2D nanosheets prepared according to Example 3.

Comparing FIGS. 2-4, in the case of hexadecanol and acetic acid, the higher reaction temperature produced material with a shorter $PL_{max}$, corresponding to smaller nanosheets. However, in the case of myristic acid (FIG. 4), though this was heated to reflux (~330° C.) for 15 hours, then 250° C. for a further 2 hours after the addition of hexadecane, these temperatures being higher than when using acetic acid as the solvent, surprisingly, longer wavelength-emitting nanosheets (corresponding with larger nanosheet dimensions) were produced at the higher temperature. These surprising observations are supported by the data in Table 1, where, for example, in the case of TOPO, increasing the reaction temperature from 330° C. to reflux (~400° C.) did not result in a blue-shift in the $PL_{max}$. Similarly, hexadecylamine (heated to ~330° C.) and acetic acid (heated to ~117-118° C.) resulted in similar $PL_{max}$ values. Thus, it was found that there is no direct correlation between reaction temperature and the resulting nanosheet size.

Figure 5:
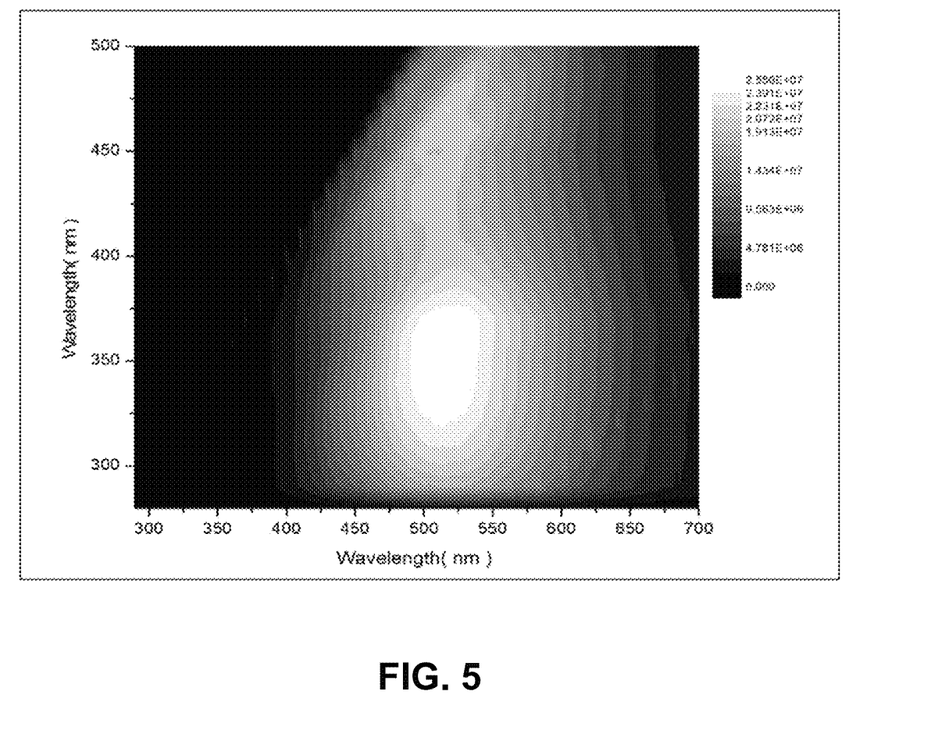
FIG. 5 shows another photoluminescence contour map of $MoS_2$ 2D nanosheets prepared and extracted according to Example 3.
Figure 6:
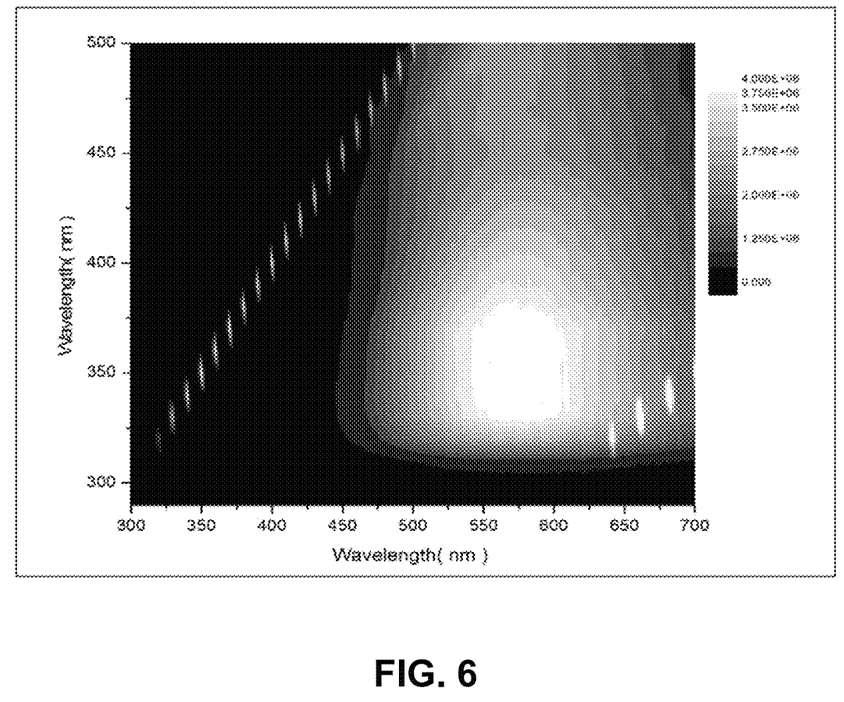
FIG. 6 shows yet another photoluminescence contour map of $MoS_2$ 2D nanosheets prepared and extracted according to Example 3.

Comparing FIGS. 4 and 5, the data show that material emitting at different wavelengths, corresponding with different nanosheet sizes, can be extracted from the reaction solution using different solvents.

These and other advantages of the present invention will be apparent to those skilled in the art from the foregoing disclosure. Accordingly, it is to be recognized that changes or modifications may be made to the above-described embodiments without departing from the broad inventive concepts of the invention. It is to be understood that this invention is not limited to the particular embodiments described herein and that various changes and modifications may be made without departing from the scope of the present invention as literally and equivalently covered by the following claims.

What is claimed is:

1. A method of preparing two-dimensional (2D) nanosheets, the method comprising:
   heating a bulk material in an organic solvent under reflux conditions for a time sufficient to effect the conversion of the bulk material into a plurality of two-dimensional (2D) nanosheets, the 2D nanosheets having thicknesses of 1 to 10 monolayers and lateral dimensions between 1 and 100 nm, wherein
   the organic solvent is selected from the group consisting of alkyl amines, fatty acids, phosphines, phosphine oxides, alcohols, alkanes, and any combination thereof.

2. The method of claim 1, wherein the bulk material is a transition metal dichalcogenide (TMDC).

3. The method of claim 2, wherein the TMDC is $MoS_2$.

4. The method of claim 2, wherein the TMDC is $MoSe_2$.

5. The method of claim 2, wherein the TMDC is $WS_2$.

6. The method of claim 2, wherein the TMDC is $WSe_2$.

7. A method of preparing two-dimensional (2D) nanosheets, the method comprising:
   heating a bulk material in an organic non-coordinating solvent for a time sufficient to effect the conversion of the bulk material into a plurality of two-dimensional (2D) nanosheets, the 2D nanosheets having thicknesses of 1 to 10 monolayers and lateral dimensions between 1 and 100 nm.

8. The method of claim 7, wherein the bulk material is a transition metal dichalcogenide (TMDC).

9. The method of claim 8, wherein the TMDC is $MoS_2$.

10. The method of claim 8, wherein the TMDC is $MoSe_2$.

11. The method of claim 8, wherein the TMDC is $WS_2$.

12. The method of claim 8, wherein the TMDC is $WSe_2$.

13. The method of claim 7, wherein the heating is performed under reflux conditions.

* * * * *